(12) United States Patent
Kishimoto et al.

(10) Patent No.: US 8,034,404 B2
(45) Date of Patent: Oct. 11, 2011

(54) METHOD FOR PRODUCING WHITE POWDER COMPRISING TITANIUM OXIDE FILM AND METALLIC SILVER FILM

(75) Inventors: Akira Kishimoto, Nishitama-gun (JP); Takafumi Atarashi, Nishitama-gun (JP); Shinichi Ogura, Nishitama-gun (JP); Kiyoshi Hoshino, Nishitama-gun (JP); Tetsurou Hoshiba, Nishitama-gun (JP); Katsuto Nakatsuka, Sendai (JP)

(73) Assignees: Nittetsu Mining Co., Ltd., Tokyo (JP); Katsuto Nakatsuka, Miyagi (JP)

( * ) Notice: Subject to any disclaimer, the term of this patent is extended or adjusted under 35 U.S.C. 154(b) by 0 days.

(21) Appl. No.: 10/558,014

(22) PCT Filed: Jun. 9, 2003

(86) PCT No.: PCT/JP03/07283
§ 371 (c)(1),
(2), (4) Date: Nov. 13, 2006

(87) PCT Pub. No.: WO2004/104112
PCT Pub. Date: Dec. 2, 2004

(65) Prior Publication Data
US 2007/0184268 A1    Aug. 9, 2007

(30) Foreign Application Priority Data
May 26, 2003   (JP) .............................. P. 2003-147701

(51) Int. Cl.
*B05D 5/06* (2006.01)
*B05D 7/00* (2006.01)
*B32B 5/16* (2006.01)

(52) U.S. Cl. ........ 427/129; 427/131; 427/132; 427/215; 427/216

(58) Field of Classification Search ................. 428/403, 428/404, 405; 427/129, 131, 132, 215, 216
See application file for complete search history.

(56) References Cited

U.S. PATENT DOCUMENTS

| | | | |
|---|---|---|---|
| 5,116,664 A | | 5/1992 | Kimura et al. |
| 5,763,085 A | * | 6/1998 | Atarashi et al. ............... 428/403 |
| 5,985,466 A | * | 11/1999 | Atarashi et al. ............... 428/570 |
| 6,325,847 B1 | * | 12/2001 | Christie et al. ................ 106/417 |
| 6,929,690 B2 | * | 8/2005 | Vogt et al. ..................... 106/403 |
| 2003/0051634 A1 | | 3/2003 | Takahashi |

FOREIGN PATENT DOCUMENTS

| | | |
|---|---|---|
| CN | 1225728 A | 8/1999 |
| CN | 1227586 A | 9/1999 |
| EP | 0907112 A1 | 4/1999 |
| EP | 0913432 A1 | 5/1999 |
| JP | 06-116509 A | 4/1994 |
| JP | 11-131102 * | 5/1999 |
| JP | 2003-003089 A | 1/2003 |
| JP | 2003-155422 A | 5/2003 |
| WO | WO 01/40383 A1 | 6/2001 |

* cited by examiner

Primary Examiner — Hoa (Holly) Le
(74) Attorney, Agent, or Firm — Sughrue Mion, PLLC

(57) ABSTRACT

A method for producing a white powder, which includes forming on a surface of a base particle a titanium oxide film and a metallic silver film contiguously one upon another in this order, wherein the base particle includes a magnetic material, and wherein said step of forming on the surface of the base particle the titanium oxide film includes dispersing the base particle in a buffer solution and adding a titanium salt aqueous solution while agitating the dispersion.

7 Claims, No Drawings

METHOD FOR PRODUCING WHITE POWDER COMPRISING TITANIUM OXIDE FILM AND METALLIC SILVER FILM

FIELD OF THE INVENTION

The present invention relates to white powder, in detail, white powder that is higher in the lightness (whiteness) more than ever and can be variously used in color ink, color filler for plastics and paper, color toner and color ink for an ink jet printer; and a method for producing the same.

BACKGROUND ART

In order to use powder in various applications, there is known a technology of covering the powder with another material to add a new function thereto. For instance, in existing one-component color magnetic toner or color magnetic ink, on magnetic base particles having the magnetism such as iron powder, a coloring layer is disposed to form. In order to obtain a clear color image with the one-component color magnetic toner or color magnetic ink, the magnetic toner or magnetic ink itself has to be colored with a brilliant color. However, since particles of a magnetic material that becomes a base material thereof are generally colored black, when a coloring layer is directly disposed on a surface thereof, as a whole, a dark color results.

On the other hand, the inventors have proposed a method of rendering powder white, in which on a surface of a base particle, under application of ultrasonic, a metallic silver film is formed, and, owing to the reflectivity of the film, powder is rendered white (for instance, patent document 1). The powder provided with the above-cited metallic silver film can reflect all incident light to be able to render the powder white. It is suggested that thus obtained white powder can be made into magnetic toner or ink, or when a surface of the white powder is provided with a coloring layer, brilliantly colored color magnetic toner or ink can be produced.

Patent Document 1

JP-A-2000-313823

However, since the whitening technology described in the patent document 1 is insufficient in the lightness of the obtained powder, a whitening technology for obtaining powder higher in the lightness is in demand.

Accordingly, the invention intends to provide a whitening technology that can obtain powder higher in the lightness more than an existing technology can.

DISCLOSURE OF THE INVENTION

The inventors found that when a titanium oxide film is disposed between a base particle and a metallic silver film the whiteness of a powder can be remarkably improved, and thereby the invention came to completion.

That is, the invention is as follows.

(1) A white powder comprising, on a surface of a base particle, a titanium oxide film and a metallic silver film in this order.

(2) The white powder according to (1) above, wherein the lightness $L^*$ is 75 or more.

(3) The white powder according to (1) above, wherein the lightness $L^*$ of the base particle is 70 or less.

(4) The white powder according to (1) above, wherein the base particle is a magnetic material.

(5) The white powder according to (1) above, wherein a film thickness of the titanium oxide film is in the range of 5 to 500 nm.

(6) A method for producing a white powder, wherein on a surface of a base particle a titanium oxide film and a metallic silver film are formed in this order.

(7) The method for producing the white powder according to (6) above, wherein the lightness $L^*$ is made 75 or more.

(8) The method for producing the white powder according to (6) above, wherein the base particle of which lightness $L^*$ is 70 or less is used.

(9) The method for producing the white powder according to (6) above, wherein a magnetic material is used as the base particle.

(10) The method for producing the white powder according to (6) above, wherein a film thickness of the titanium oxide film is in the range of 5 to 500 nm.

According to the white powder of the invention, between the base particle and the metallic silver film, a titanium oxide film is disposed and thereby the lightness can be remarkably improved. Furthermore, according to the white powder of the invention, between the base particle and the metallic silver film, a titanium oxide film is disposed and thereby, even when a film thickness of the metallic silver film is made thinner than that of existing metallic silver film-covered white powder, the lightness same as or higher than ever can be obtained.

Since a film thickness of the metallic silver film can be made thinner than that of existing metallic silver film-covered white powder, the function of the base particle can be exerted highly in such a manner that, when for instance a magnetic material is used as the base particle, the magnetization of the white powder can be made higher more than ever.

In what follows, the invention will be more detailed.

As a titanium oxide film disposed on a surface of the base particle of the white powder of the invention, tetra-valent titanium oxide (IV) ($TiO_2$) is mainly used; however, divalent titanium oxide (II) (TiO), trivalent titanium oxide (III) ($Ti_2O_3$), and titanium peroxide [$TiO_3 \cdot nH_2O$] can be used as well; furthermore, titanium (IV) hydroxide [$Ti(OH)_4$] that is a hydrate of titanium oxide (IV) as well can be effectively used; and still furthermore, titanium (II) hydroxide [$Ti(OH)_2$] and titanium (III) hydroxide [$Ti(OH)_3$] can be also used.

As a method of forming a titanium oxide film on a surface of the base particle of the white powder of the invention, without restricting to particular one, known hydrolysis of titanium alkoxide (metal alkoxide) or aqueous deposition such as a reaction from a titanium salt (metal salt) aqueous solution can be used to form.

In a method of forming a titanium oxide film on a surface of the base particle owing to the hydrolysis of titanium alkoxide, for instance titanium alkoxide is mixed with alcohol to form a solution, a base particle are added to the solution to form a dispersion, and water is dropped while agitating the dispersion. In more detail, a method described in WO 96/28269 can be cited.

Furthermore, in a method of forming a titanium oxide film on a surface of the base particle owing to the aqueous deposition such as a reaction from a titanium salt aqueous solution, for instance, in a buffering solution, base particles are added to form a dispersion, and a titanium salt aqueous solution is dropped while agitating the dispersion. In more detail, a method described in JP-A-11-131102 can be cited.

When the method owing to the hydrolysis of titanium alkoxide and the method owing to aqueous deposition are compared, the method owing to the hydrolysis of titanium alkoxide has to use an organic solvent high in the inflammability as a solvent and a metal alkoxide that is an expensive compound as a raw material. In order to use an organic solvent high in the inflammability, production facilities have to be made explosion-proof, and temperature and humidity have to be severely managed. Accordingly, products manufactured therewith are naturally expensive in total. As a result, the method owing to the aqueous deposition is more preferable than the method owing to the hydrolysis of titanium alkoxide.

Furthermore, among the methods owing to the aqueous deposition, it has been recently found that a method that uses peroxotitanic acid is effective.

In the method that uses peroxotitanic acid, base particles are added in for instance a buffering solution to form a dispersion, and, with the dispersion agitating, a peroxotitanic acid solution is dropped.

The peroxotitanic acid solution can be prepared by mixing deionized water, aqueous ammonia and hydrogen peroxide and water with a titanium trichloride solution or a titanium tetrachloride solution.

A thickness of a titanium oxide film of the white powder according to the invention, though different dependent on a material and particle diameter of the base particle, a thickness of the metallic silver film and the density, is not particularly restricted; however, it is preferably in the range of 5 to 500 nm, more preferably in the range of 10 to 200 nm and still more preferably in the range of 50 to 200 nm.

When the film thickness is 5 nm or more, the lightness becomes sufficient and, when it is 500 nm or less, in the case of the magnetic material being used as the base particles, since the magnetization of the white powder is not deteriorated, the function of the base particles can be highly retained.

As a method of forming a metallic silver film in the white powder according to the invention, without restricting to particular one, known methods can be cited. Among these, well-known electroless plating can be cited.

In what follows, an example of deposition of a metallic silver film according to the known electroless plating will be described.

In the beginning, in 1000 ml of water maintained at a temperature in the range of 80 to 100° C. in a water bath, 20 to 150 g of glucose and 1.5 to 14 g of tartaric acid are sequentially dissolved followed by keeping there for 10 min or more. This is cooled to room temperature, followed by adding 50 to 2000 ml of alcohol thereto. At this time, when an amount of added alcohol is less than 50 ml, in some cases, a reduction reaction may not occur. On the other hand, when it is more than 2000 ml, since concentrations of glucose and tartrate ion necessary for reducing a silver ion are lowered, in some cases, the reaction may not be caused. An obtained mixture is a reducing solution. Alcohol may be any one of methanol, ethanol and a mixture thereof.

In the next place, an aqueous ammonia solution (28%) is added to 100 g of silver nitrate until it is completely dissolved, followed by adding 1 to 4 L of water. At this time, when an amount of water added is less than necessary, in some cases, the pH may come down and silver may precipitate as a complex again. On the other hand, when water is added too much, since the concentration of silver comes down, when it is mixed with a reducing solution, in some cases, a film having a sufficient thickness may not be obtained. At this time, silver nitrate may be dissolved first, followed by adding aqueous ammonia. Then, when 1 to 4 L of a 0.5 to 2 N sodium hydroxide aqueous solution is added, a black or blackish brown complex precipitates. Under thorough agitation, an aqueous ammonia solution (28%) is added until the black precipitate disappears, and thereby a silver solution is obtained.

To thus obtained silver solution, powder where on a surface of a base particle a titanium oxide film is formed is added. An amount being added, since it depends on a thickness of a metallic silver film formed and a color and particle diameter of the base powder, is preferably in the range of 5 to 500 g to 100 g of silver nitrate. In the case of an amount of the powder being too little, a thickness of the metallic silver film becomes too thick, resulting in deteriorating the characteristics of the base powder. On the contrary, when it is too much, the metallic silver film becomes too thin, in some cases, dark gray powder results.

When the powder is added followed by thoroughly agitating, the agitation is preferably applied at an as far as possible high-speed, or the powder is thoroughly dispersed by use of an ultrasonic washer. After thorough dispersion, while continuing on to apply the agitation and the ultrasonic wave, a reducing solution substantially equal in an amount as the silver solution is added, followed by agitating for 1 to 30 min, preferably for 3 to 15 min until the reducing reaction comes to completion, and thereby a metallic silver film is formed on a surface of the powder. When a reaction time at this time is shorter than 1 min, in some cases, a sufficient film cannot be obtained, and, when it elapses substantially 30 min, in some cases, the precipitation of the metallic silver comes to completion. A solid content is filtered, followed by repeating washing to thoroughly remove an ammonia ion. When an ammonia ion is not thoroughly removed, in some cases, ammonia and silver react to cause the color of the metallic silver film to deteriorate. In the next place, the filtered cake is vacuum dried, and thereby white powder is obtained.

As the base particle that is used in the white powder, without restricting to particular one, any one of inorganic materials and organic materials containing a metal, magnetic materials, dielectric materials, conductive materials and insulating materials can be used. In the case of the base material being a metal, any one of metals such as iron, nickel, chromium, titanium and aluminum may be used. When the magnetism thereof is utilized, magnetic one such as iron can be preferably used. These metals may be in a form of an alloy, and when it is magnetic one a ferromagnetic alloy can be preferably used. Furthermore, when the base material is a metal compound, as a typical one thereof, oxides of the above-mentioned metals can be cited. For instance, oxides of, other than iron, nickel, chromium, titanium, aluminum and silicon, calcium, magnesium and barium, or compound oxides thereof may be used. Still furthermore, as metal compounds other than metal oxides, metal nitrides, metal carbides, metal sulfides, metal fluorides, metal carbonates and metal phosphates can be cited.

Furthermore, as the base powder, compounds of, other than metals, semimetals and non-metals, in particular, oxides, carbides and nitrides thereof such as silica and glass beads can be used. As other inorganic materials, inorganic hollow particles such as Shirasu balloon (hollow silicate particles), fine carbon hollow balls (crecasphere), electrofused bubble alumina, aerosil, white carbon, silica fine hollow balls, calcium carbonate fine hollow balls, calcium carbonate, perlite, talc, bentonite, micas such as synthetic mica and white mica, and kaolin can be used.

As the organic materials, resin particles are preferable. As specific examples of the resin particles, cellulose powder, cellulose acetate powder, polyamide, an epoxy resin, polyester, a melamine resin, polyurethane, a vinyl acetate resin, a silicon resin, spherical or pulverized particles obtained by polymerizing or copolymerizing acrylic ester, methacrylic ester, styrene, ethylene, propylene and derivatives thereof can be cited. Particularly preferable resin particles are spherical acrylic resin particles obtained by polymerizing acrylic or methacrylic ester. When the resin particles are taken as the base material, a heating temperature in the drying process has to be set at a temperature equal to or less than a melting point of the resin.

As a shape of the base material, isotropic bodies such as a sphere, a subsphere and a regular polyhedron, polyhedrons such as a rectangular parallelepiped, a spheroid, a rhombohedron, a plate-like body and a needle-like body (cylinder and rectangular column) and utterly irregular powder such as pulverized body can be used. A particle diameter of the base material is not particularly restricted; however, one that is in the range of 0.01 μm to several millimeters is preferable.

Furthermore, as to the specific gravity of the base material, ones having the specific gravity in the range of 0.1 to 10.5 can be used. However, when the obtained powder is dispersed in a liquid and used, from the viewpoints of the fluidity and the floating properties, the specific gravity is preferably in the range of 0.1 to 5.5, more preferably in the range of 0.1 to 2.8 and still more preferably in the range of 0.5 to 1.8. When the obtained powder is dispersed in a liquid and used, as far as the specific gravity of the base material is 0.1 or more, since the buoyancy in the liquid is not excessively large, there is no need of forming a film into multi-layers or very thick. On the other hand, when the specific gravity is 10.5 or less, there is no need of making a floating film thicker.

BEST MODE FOR CARRYING OUT THE INVENTION

The invention will be more detailed with reference to examples below; however, the invention is not restricted to the examples.

Example 1

Coating of Titanium Oxide Film

In 0.34 kg of a titanium tetrachloride solution reagent (manufactured by Kanto Kagaku), 2.09 kg of deionized water, 0.56 kg of an aqueous ammonia reagent (manufactured by Kanto Kagaku) and 2.16 kg of a hydrogen peroxide and water reagent (manufactured by Kanto Kagaku) are mixed, and thereby a transparent yellow solution of peroxotitanic acid is obtained.

In the next place, in 30 kg of deionized water, 0.53 kg of an anhydrous boric acid reagent (manufactured by Kanto Kagaku), 0.64 kg of a potassium chloride reagent (manufactured by Kanto Kagaku) and 0.14 kg of a sodium hydroxide reagent (manufactured by Kanto Kagaku) are dissolved, followed by suspending 3.00 kg of silica-coated planar permalloy powder. A particle diameter of the silica-coated planar permalloy powder, which is measured by use of a laser diffraction method is 17 μm by $D_{50}$ diameter (with a Microtrack X100 manufactured by Nikkiso Co., Ltd., and with the refractive index of the powder taken at 1.53), the mass magnetization under application of a magnetic field of 79.6 kA/m (1 kOe) is 59 A·m/kg (59 emu/g) and the lightness L* is 53.

The suspension is agitated at 1200 rpm, and, with a liquid temperature maintaining at 50° C., a solution of peroxotitanic acid is dropped at a rate of 300 mL/min and blended. After the dropping and agitation come to completion, the agitation is continued for 2 hr.

After the agitation, dilution and washing with deionized water are repeated several times, thereby byproducts such as a chloride ion and so on generated by the reaction are removed, followed by drying, further followed by heating in a nitrogen atmosphere at 500° C. for 1 hr, and thereby titanium oxide film-covered powder is obtained. The mass magnetization of the obtained titanium oxide film-coated powder under application of a magnetic field of 79.6 kA/m (1 kOe) is 52 A·m/kg (52 emu/g) and the lightness L* is 62. A microscopic observation of powder sections reveals that a film thickness ranges from 60 to 70 nm.
(Coating of Silver Film)

In 1000 g of deionized water, 45 g of glucose, 4.5 g of tartaric acid and 80 g of ethanol are dissolved, followed by storing at room temperature for 1 week, and thereby a reducing solution is prepared.

Subsequently, 108 kg of deionized water, 1.5 kg of a sodium hydroxide reagent (manufactured by Kanto Kagaku), 2.1 kg of silver nitrate and 3.6 kg of an aqueous ammonia reagent (manufactured by Kanto Kagaku) are mixed, and thereby a colorless transparent silver ammine complex is obtained. To the obtained solution, 2.85 kg of titanium oxide film-coated powder prepared in the foregoing process is suspended.

Under irradiation of ultrasonic wave on the suspension, 36.0 L of the reducing solution is mixed, followed by agitating for 30 min.

After the agitation, dilution and washing with deionized water are repeated several times, thereby byproducts such as a nitrate ion and so on generated by the reaction are removed, followed by drying, and thereby silver film-coated powder is obtained. A particle diameter of the obtained silver film-coated powder, which is measured by use of a laser diffraction method is 17 μm by $D_{50}$ diameter (with a Microtrack X100 manufactured by Nikkiso Co., Ltd., and with the powder as a refractive body), and the mass magnetization under application of a magnetic field of 79.6 kA/m (1 kOe) is 37 A·m/kg (37 emu/g).

Examples 2 to 4

Coating of Titanium Hydroxide Film

In 0.28 kg of a titanium tetrachloride solution reagent (manufactured by Sumitomo Titanium Corp., Ti concentration: 16.5%), 1.74 kg of deionized water, 0.49 kg of an aqueous ammonia reagent (manufactured by Kanto Kagaku) and 1.80 kg of a hydrogen peroxide and water reagent (manufactured by Kanto Kagaku) are mixed, and thereby a transparent yellow solution of peroxotitanic acid is obtained.

In the next place, in 2.5 kg of deionized water, 0.44 kg of an anhydrous boric acid reagent (manufactured by Kanto Kagaku), 0.53 kg of a potassium chloride reagent (manufactured by Kanto Kagaku) and 0.11 kg of a sodium hydroxide reagent (manufactured by Kanto Kagaku) are dissolved, followed by suspending 1.84 kg of silica-coated planar permalloy powder. A particle diameter of the silica-coated planar permalloy powder, which is measured by use of a laser diffraction method, is 17 μm by $D_{50}$ diameter (with a Microtrack X100 manufactured by Nikkiso Co., Ltd., and with the refractive index of the powder set at 1.53), the mass magnetization under application of a magnetic field of 79.6 kA/m (1 kOe) is 56 A·m/kg (56 emu/g) and the lightness L* is 54.

The suspension is agitated at 1200 rpm, and, with a liquid temperature maintaining at 50° C., a solution of peroxotitanic acid is dropped at a rate of 240 mL/min and blended. After completion of the dropping and agitation, the agitation is continued for 2 hr.

After the agitation, dilution and washing with deionized water are repeated several times, thereby byproducts such as a chloride ion and so on generated by the reaction are removed, followed by drying, and thereby titanium hydroxide film-coated powder is obtained. The mass magnetization of the obtained titanium hydroxide film-coated powder under application of a magnetic field of 79.6 kA/m (1 kOe) is 51 A·m/kg (51 emu/g) and the lightness L* is 59. A microscopic observation of powder sections reveals that a film thickness ranges from 90 to 100 nm.
(Coating of Silver Film)

In 1000 g of deionized water, 45 g of glucose, 4.5 g of tartaric acid and 80 g of ethanol are dissolved, followed by storing at room temperature for 1 week, and thereby a reducing solution is prepared.

Subsequently, 720 g of deionized water, 15 g of a sodium hydroxide reagent (manufactured by Kanto Kagaku), 36 g of an aqueous ammonia reagent (manufactured by Kanto Kagaku) and 21 g of silver nitrate are mixed, and thereby a colorless transparent silver ammine complex is obtained.

To the obtained solution, titanium hydroxide film-coated powder prepared in the foregoing process is suspended. Under irradiation of ultrasonic wave on the suspension, 720 g of the reducing solution is mixed, followed by agitating for 30 min. An amount of the suspended titanium hydroxide film-coated powder is shown in a table below.

TABLE 1

|  | Example 2 | Example 3 | Example 4 |
|---|---|---|---|
| Amount of suspended titanium hydroxide film-coated powder | 30 g | 45 g | 60 g |

After the agitation, dilution and washing with deionized water are repeated several times, thereby byproducts such as a nitrate ion and so on generated by the reaction are removed, followed by drying, and thereby silver film-covered powder is obtained. Particle diameters of obtained silver film-coated powders ($D_{50}$ diameter; measured with a Microtrack X100 manufactured by Nikkiso Co., Ltd., and with the powder as a refractive body), the mass magnetizations under application of a magnetic field of 79.6 kA/m (1 kOe), and the lightnesses L* are shown in a table below.

TABLE 2

|  | Example 2 | Example 3 | Example 4 |
|---|---|---|---|
| Particle diameter ($D_{50}$ diameter) | 17 μm | 17 μm | 17 μm |
| Mass magnetization (applied magnetic field: 79.6 kA/m (1 kOe)) | 35 A·m/kg (35 emu/g) | 38 A·m/kg (38 emu/g) | 41 A·m/kg (41 emu/g) |
| Lightness L* | 85 | 83 | 78 |

Comparative Examples 1 to 3

Coating of Silver Film

Except that the suspended base powder is silica-coated planar permalloy powder shown in Example 1, coating of silver film is carried out similarly to the coating of silver film according to example 2. Amounts of suspended silica-coated planar permalloy powder are shown in a table below.

TABLE 3

|  | Comparative Example 1 | Comparative Example 2 | Comparative Example 3 |
|---|---|---|---|
| Amount of suspended silica-coated planar permalloy powder | 12 g | 21 g | 30 g |

Particle diameters of obtained silver film-coated powders ($D_{50}$ diameter; measured with a Microtrack X100 manufactured by Nikkiso Co., Ltd., and with the powder as a refractive body), the mass magnetizations under application of a magnetic field of 79.6 kA/m (1 kOe), and the lightnesses L* are shown in a table below.

TABLE 4

|  | Comparative Example 2 | Comparative Example 3 | Comparative Example 4 |
|---|---|---|---|
| Particle diameter ($D_{50}$ diameter) | 17 μm | 17 μm | 17 μm |
| Mass magnetization (applied magnetic field: 79.6 kA/m (1 kOe)) | 32 A·m/kg (32 emu/g) | 41 A·m/kg (41 emu/g) | 42 A·m/kg (42 emu/g) |
| Lightness L* | 74 | 73 | 69 |

Examples 5 and 6

Coating of Titanium Hydroxide Film

In 25 g of a titanium trichloride solution reagent (manufactured by Kanto Kagaku), 51 g of an aqueous ammonia reagent (manufactured by Kanto Kagaku) and 25 g of a hydrogen peroxide and water reagent (manufactured by Kanto Kagaku) are mixed, and thereby a transparent yellow solution of peroxotitanic acid is obtained.

In the next place, in 700 g of a 0.4 mol/L boric acid-potassium chloride-sodium hydroxide solution, 100 g of spherical iron powder is suspended. A particle diameter of the spherical iron powder, which is measured by use of a laser diffraction method, is 3 μm by $D_{50}$ diameter (with a Microtrack X100 manufactured by Nikkiso Co., Ltd., and with the refractive index of the powder taken at 1.53), the mass magnetization thereof under application of a magnetic field of 79.6 kA/m (1 kOe) is 55 A·m/kg (56 emu/g) and the lightness L* is 58.

Under agitation of the suspension at 1200 rpm, the solution of peroxotitanic acid is dropped at a rate of 1.4 g/min and blended. After completion of the dropping and agitation, the agitation is continued for 2 hr.

After the agitation, dilution and washing with deionized water are repeated several times, thereby byproducts such as a chloride ion and so on generated by the reaction are removed, followed by drying, and thereby titanium hydroxide film-coated powder is obtained. The mass magnetization of the obtained titanium hydroxide film-coated powder under application of a magnetic field of 79.6 kA/m (1 kOe) is 54 A·m/kg (54 emu/g) and the lightness L* is 54. A microscopic observation of powder sections reveals that a film thickness ranges from 10 to 20 nm.

(Coating of Silver Film)

In 1000 g of deionized water, 45 g of glucose, 4.5 g of tartaric acid and 80 g of ethanol are dissolved, followed by storing at room temperature for 1 week, and thereby a reducing solution is prepared.

Subsequently, 2400 g of deionized water, 50 g of a sodium hydroxide reagent (manufactured by Kanto Kagaku), 120 g of an aqueous ammonia reagent (manufactured by Kanto Kagaku) and 70 g of silver nitrate are mixed, and thereby a colorless transparent silver ammine complex is obtained.

To the obtained solution, titanium hydroxide film-coated powder prepared in the foregoing process is suspended. Under irradiation of ultrasonic wave on the suspension, 2400 g of the reducing solution is mixed, followed by agitating for 30 min. Amounts of the suspended titanium hydroxide film-coated powders are shown in a table below.

TABLE 5

|  | Example 5 | Example 6 |
|---|---|---|
| Amount of suspended titanium hydroxide film-coated powder | 300 g | 200 g |

After the agitation, dilution and washing with deionized water are repeated several times, thereby byproducts such as a nitrate ion and so on generated by the reaction are removed, followed by drying, and thereby silver film-coated powder is obtained. Particle diameters of obtained silver film-coated powders ($D_{50}$ diameter; measured with a Microtrack X100 manufactured by Nikki so Co., Ltd., and with the powder as a refractive body), the mass magnetizations under application of a magnetic field of 79.6 kA/m (1 kOe), and the lightnesses L* are shown in a table below.

TABLE 6

|  | Example 5 | Example 6 |
|---|---|---|
| Particle diameter ($D_{50}$ diameter) | 3 μm | 3 μm |
| Mass magnetization (applied magnetic field: 79.6 kA/m (1 kOe)) | 39 A · m/kg (39 emu/g) | 36 A · m/kg (36 emu/g) |
| Lightness L* | 73 | 79 |

Examples 7 to 9

Coating of Titanium Hydroxide Film

In 11 g of a titanium tetrachloride solution reagent (manufactured by Wako Pure Chemical Industries, Ltd.), 68 g of deionized water, 22 g of an aqueous ammonia reagent (manufactured by Kanto Kagaku) and 70 g of a hydrogen peroxide and water reagent (manufactured by Kanto Kagaku) are mixed, and thereby a transparent yellow solution of peroxotitanic acid is obtained.

In the next place, in 420 g of a 0.4 mol/L boric acid-potassium chloride-sodium hydroxide solution, 60 g of spherical iron powder shown in example 6 is suspended.

Under agitation at 1000 rpm of the suspension, the solution of peroxotitanic acid is dropped at a rate of 2.8 g/min and blended. After completion of the dropping and agitation, the agitation is continued for 2 hr.

After the agitation, dilution and washing with deionized water are repeated several times, thereby byproducts such as a chloride ion and so on generated by the reaction are removed, followed by drying, and thereby titanium hydroxide film-coated powder is obtained. The mass magnetization of the obtained titanium hydroxide film-coated powder under application of a magnetic field of 79.6 kA/m (1 kOe) is 47 A·m/kg (47 emu/g) and the lightness L* is 49. A microscopic observation of powder sections reveals that a film thickness ranges from 150 to 160 nm.

(Coating of Silver Film)

In 1000 g of deionized water, 45 g of glucose, 4.5 g of tartaric acid and 80 g of ethanol are dissolved, followed by storing at room temperature for 1 week, and thereby a reducing solution is prepared.

Subsequently, 2400 g of deionized water, 50 g of a sodium hydroxide reagent (manufactured by Kanto Kagaku), 120 g of an aqueous ammonia reagent (manufactured by Kanto Kagaku) and 70 g of silver nitrate are mixed, and thereby a colorless transparent silver ammine complex is obtained.

To the obtained solution, titanium hydroxide film-coated powder prepared in the foregoing process is suspended. Under irradiation of ultrasonic wave on the suspension, 2400 g of the reducing solution is mixed, followed by agitating for 30 min. Amounts of the suspended titanium hydroxide film-coated powders are shown in a table below.

TABLE 7

|  | Example 7 | Example 8 | Example 9 |
|---|---|---|---|
| Amount of suspended titanium hydroxide film-coated powder | 300 g | 200 g | 100 g |

After the agitation, dilution and washing with deionized water are repeated several times, thereby byproducts such as a nitrate ion and so on generated by the reaction are removed, followed by drying, and thereby silver film-coated powder is obtained. Particle diameters of obtained silver film-coated powders ($D_{50}$ diameter; measured with a Microtrack X100 manufactured by Nikkiso Co., Ltd., and with the powder as a refractive body), the mass magnetizations under application of a magnetic field of 79.6 KA/m (1 kOe), and the lightnesses L* are shown in a table below.

TABLE 8

|  | Example 7 | Example 8 | Example 9 |
|---|---|---|---|
| Particle diameter ($D_{50}$ diameter) | 3 μm | 4 μm | 4 μm |
| Mass magnetization (applied magnetic field: 79.6 KA/m (1 kOe)) | 39A · m/kg (39 emu/g) | 35 A · m/kg (35 emu/g) | 29 A · m/kg (29 emu/g) |
| Lightness L* | 74 | 81 | 84 |

Comparative Examples 4 to 8

Coating of Silver Film

Except that the suspended base powder is spherical iron powder shown in Example 6, coating of silver film is carried out similarly to the coating of silver film according to Example 6. Amounts of suspended spherical iron powders are shown in a table below.

TABLE 9

|  | Comparative Example 4 | Comparative Example 5 | Comparative Example 6 | Comparative Example 7 | Comparative Example 8 |
|---|---|---|---|---|---|
| Amount of suspended spherical iron powder | 300 g | 200 g | 100 g | 70 g | 60 g |

Particle diameters of the obtained silver film-coated powders ($D_{50}$ diameter; measured with a Microtrack X100 manufactured by Nikkiso Co., Ltd., and with the powder as a refractive body), the mass magnetizations under application of a magnetic field of 79.6 kA/m (1 kOe), and the lightnesses L* are shown in a table below.

TABLE 10

|  | Comparative Example 4 | Comparative Example 5 | Comparative Example 6 | Comparative Example 7 | Comparative Example 8 |
|---|---|---|---|---|---|
| Particle diameter ($D_{50}$ diameter) | 3 μm | 3 μm | 4 μm | 4 μm | 5 μm |
| Mass magnetization (applied magnetic field: 79.6 kA/m (1 kOe)) | 40 A·m/kg (40 emu/g) | 37 A·m/kg (37 emu/g) | 30 A·m/kg (30 emu/g) | 26 A·m/kg (26 emu/g) | 22 A·m/kg (22 emu/g) |
| Lightness L* | 61 | 64 | 69 | 72 | 74 |

INDUSTRIAL APPLICABILITY

The white powder according to the invention, having a titanium oxide film between a base particle and a metallic silver film, can greatly improve the lightness thereof, and furthermore, owing to possession of the titanium oxide film, even when a film thickness of the metallic silver film is made thinner than that of existing metallic silver film-coated white powder, can obtain the lightness equal to or higher than ever. Accordingly, since the film thickness of the metallic silver film can be made thinner than that of the existing metallic silver film-coated white powder, the function of the base powder can be highly exerted in such a manner that, when for instance a magnetic material is used as base powder, the magnetization of the white powder becomes higher than ever.

The invention claimed is:

1. A method for producing a white powder, which comprises forming on a surface of a base particle a titanium oxide film and a metallic silver film contiguously one upon another in this order, wherein the base particle comprises a magnetic material, and
   wherein said step of forming on the surface of the base particle the titanium oxide film comprises dispersing the base particle in a buffer solution and adding a titanium salt aqueous solution while agitating the dispersion, wherein the titanium salt aqueous solution is a solution of a salt of a peroxotitanic acid solution.

2. The method for producing a white powder according to claim 1, wherein said white powder has a lightness L* of 75 or more.

3. The method for producing a white powder according to claim 1, wherein the base particle has a lightness L* of 70 or less.

4. The method for producing a white powder according to claim 1, wherein the titanium oxide film has a film thickness in the range of 5 to 500 nm.

5. The method for producing a white powder according to claim 1, wherein the lightness L* of the white powder is 75 or more, the lightness L* of the base particle is 70 or less, and the metallic silver film has a thickness in the range of 5 to 500 nm.

6. The method for producing a white powder according to claim 1, wherein the base particle is a black colored magnetic particle, the metallic silver film has a thickness of 5 to 200 nm and the white powder has a mass magnetization under an applied magnetic field of 1 kOe of at least 35 emu/g.

7. The method for producing a white powder according to claim 1, wherein said adding comprises dropwise adding.

* * * * *